US007599714B2

(12) United States Patent
Kuzminskiy (10) Patent No.: US 7,599,714 B2
(45) Date of Patent: Oct. 6, 2009

(54) INCREASING THE RANGE OF ACCESS POINT CELLS FOR A GIVEN THROUGHPUT IN A DOWNLINK OF A WIRELESS LOCAL AREA NETWORK

(75) Inventor: Alexandr Kuzminskiy, Swindon (GB)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 481 days.

(21) Appl. No.: 11/241,896

(22) Filed: Sep. 30, 2005

(65) Prior Publication Data

US 2007/0077968 A1 Apr. 5, 2007

(51) Int. Cl.
*H04M 1/00* (2006.01)
(52) U.S. Cl. ............ 455/562.1; 375/298; 455/63; 343/893; 343/725; 343/730; 343/229; 343/797
(58) Field of Classification Search .............. 455/63, 455/562.1, 561, 561.2, 575.7; 343/893, 725, 343/730, 229, 797
See application file for complete search history.

(56) References Cited

U.S. PATENT DOCUMENTS

| | | | | |
|---|---|---|---|---|
| 6,370,182 | B2* | 4/2002 | Bierly et al. | 375/140 |
| 6,687,188 | B2* | 2/2004 | Yang | 367/134 |
| 6,795,424 | B1* | 9/2004 | Kapoor et al. | 370/343 |
| 7,257,425 | B2* | 8/2007 | Wang et al. | 455/562.1 |
| 7,299,071 | B1* | 11/2007 | Barratt et al. | 455/562.1 |
| 2002/0051433 | A1* | 5/2002 | Affes et al. | 370/335 |
| 2002/0105928 | A1* | 8/2002 | Kapoor et al. | 370/334 |
| 2003/0100343 | A1* | 5/2003 | Zourntos et al. | 455/562 |
| 2003/0204380 | A1* | 10/2003 | Dishman et al. | 702/189 |

(Continued)

OTHER PUBLICATIONS

P. Zetterberg et al (IEEE publication 2002: Performance of multiple receive, multiple transmit beamforming in WLAN type system under power or EIRP constraints with delayed channel).*

(Continued)

*Primary Examiner*—Duc Nguyen
*Assistant Examiner*—Hai V Nguyen (57) ABSTRACT

The present invention provides a method and an apparatus may increase or extend the range of wireless communication cells for a given throughput in a downlink of a wireless communication system. When transmitting data in a downlink of a plurality of access point cells in a wireless local area network (WLAN), the range of the downlink may be increased for a given throughput under one or more radiated power constraints. The method includes providing a plurality of antennas at an access point to transmit the data to a wireless unit under at least one of a first and a second radiated power constraints. The method further includes using the plurality of antennas for beamforming over a group of sub-carriers subject to the first and/or second radiated power constraints. Under one or more radiated power constraints, a multiple antenna based beamforming may extend the range of a wireless communication for a user of a wireless unit that may be located within a coverage area across the plurality of access point cells of a Wi-Fi network associated with the WLAN. A joint beamforming optimized over all of sub-carriers may account for a European regulation restriction into at least one of an averaged and a spectral density Equivalent Isotropic Radiated Power (EIRP) constraint. In this way, an Orthogonal Frequency-Division Multiplexing (OFDM) based joint beamformer may provide a significant performance improvement and range extension.

20 Claims, 8 Drawing Sheets

U.S. PATENT DOCUMENTS

| | | | | |
|---|---|---|---|---|
| 2003/0214881 | A1* | 11/2003 | Yang | 367/134 |
| 2004/0146024 | A1* | 7/2004 | Li et al. | 370/334 |
| 2004/0157646 | A1* | 8/2004 | Raleigh et al. | 455/562.1 |
| 2005/0003828 | A1* | 1/2005 | Sugar et al. | 455/456.1 |
| 2005/0113116 | A1* | 5/2005 | Avidor et al. | 455/456.5 |
| 2005/0130606 | A1* | 6/2005 | Wang et al. | 455/101 |
| 2006/0023653 | A1* | 2/2006 | Montalbano | 370/315 |
| 2006/0030364 | A1* | 2/2006 | Olesen et al. | 455/562.1 |
| 2006/0083338 | A1* | 4/2006 | Giannakis et al. | 375/343 |
| 2006/0252436 | A1* | 11/2006 | Tirkkonen et al. | 455/501 |
| 2006/0258403 | A1* | 11/2006 | Vaidyanathan | 455/562.1 |
| 2007/0010203 | A1* | 1/2007 | Wee et al. | 455/63.1 |
| 2007/0054633 | A1* | 3/2007 | Piirainen | 455/115.3 |
| 2007/0109954 | A1* | 5/2007 | Pasanen et al. | 370/204 |
| 2007/0254597 | A1* | 11/2007 | Li et al. | 455/69 |
| 2008/0002788 | A1* | 1/2008 | Akhtar et al. | 375/298 |

OTHER PUBLICATIONS

Vinki Erceg, Zyray Wireless; et al "Wireless LANs" IEEE P802.11 Jan. 2004.

European Telecommunications Standards Institute "Electromagnetic compatibility and Radio Spectru Matters (ERM); Wideband Transmission systems; Data transmission equipment operating in the 2,4 Ghz ISM band and using spread spectrum modulation techniques; Part 2: Harmonized EN covering essential requirements under article 3.2 of the R&TTE Directive" ETSI 2001.

Relating to the Use of Short Range Devices (SRD); Spectrum Engineering Working Groups Jan. 2005.

Broadband Radio Access Networks (BRAN); 5 GHz high performance RLAN; HarmonizedEN covering essential requirements of article 3.2 of the R&TTE Directive; European Telecommunications Standards Institute 2003.

James K. Cavers "Multiuser Transmitter Diversity Through Adaptive Downlink Beamforming" IEEE 1999.

"Simply Unparalleled" PC Magazine.

Diego Bartolome, et al. "Modified SMI Techniques for Frequency Selective Channels in OFDM" IEEE 2002.

P. Zetterberg, et al. "Downlink Beamforming with Delayed Channel Estimates under Total Power, Element Power and Equivalent Isotropic Radiated Power (EIRP) Constraints" IEEE 2001.

P. Zetterberg, et al. "Performance of Multiple-Receive Multiple-Transmit Beamforming in WLAN-type Systems under Power or EIRP Constraints with Delayed Channel Estimates" IEEE 2002.

* cited by examiner

INCREASING THE RANGE OF ACCESS POINT CELLS FOR A GIVEN THROUGHPUT IN A DOWNLINK OF A WIRELESS LOCAL AREA NETWORK

FIELD OF THE INVENTION

This invention relates generally to telecommunications, and more particularly, to wireless communications.

DESCRIPTION OF THE RELATED ART

Wireless communications systems or mobile telecommunication systems typically provide different types of services to different users or subscribers of wireless communication devices. A wireless local area network (WLAN) generally includes one or more access points (APs) that can establish wireless communications links with wireless units. A wireless communications link between a wireless unit and an access point (AP) may use an uplink from the wireless unit to the access point and a downlink in the reverse direction.

To establish the wireless communications link for a connection or session, the access point typically includes radio transceivers to transmit and receive radio frequency signals. Over the uplink, signaling information and user information may be received over the air interface at an access point. Over the downlink, signaling information and user information may be transmitted over the air interface on designated radio frequency channels from an access point. Using the uplink and downlink, both control and user information may be transmitted between the wireless unit and the access point (AP) over an air interface that may use a suitable wireless communications medium, such as radio frequency (RF) signals.

For establishing wireless or mobile communications, Institute of Electrical and Electronics Engineers (IEEE) has specified a set of standards for a host of wireless networks, such as for wireless local area networks (WLAN) including IEEE 802.11b or Wireless Fidelity (Wi-Fi) standard. The term "Wi-Fi" is promulgated by Wireless Ethernet Compatibility Alliance (WECA) as a trade name for the IEEE 802.11b standard.

Over a Wi-Fi network, wireless units, such as Wi-Fi enabled devices from different manufacturers may cooperatively operate with each other. For example, a Wi-Fi enabled device user may communicate with an Access Point (AP) that is consistent with the Wi-Fi standard. Many wireless service providers deliver mobile high-speed data services to users of wireless units. A Wi-Fi network may enables a high-frequency wireless local area network (WLAN) used as an alternative to a wired LAN of a business or a home, as examples. The Wi-Fi network having a short wireless range of few hundred feet, e.g., 300 feet, provide a small coverage area to a user of a Wi-Fi enabled device, such as a cell phone. A Wi-Fi network enables a relatively high-speed wireless data or media service or access at airports and hotels, for example, to wireless units including cellular, mobile, wireless or satellite phones, laptop computers, and portable or handheld devices including personal digital assistants (PDAs) and global positioning systems (GPSs).

To transmit data to a single antenna wireless unit with a given throughput various antenna techniques including beamforming is used. In a beamformer, a transmitted signal in an antenna is formed by multiplying the transmitted signal and antenna weights, which may be calculated based on channel estimates and constraints. For example, a conventional Maximum Ratio (MR) combining approach subject to a Total Power (TP) constraint for the antenna weights in the 1×N broadband an Orthogonal Frequency-Division Multiplexing (OFDM) case relevant for the IEEE 802.11a/g systems, can be formulated as follows:

$$w_{TP}(f) = \alpha(f)\sqrt{P_T} w_{MR}(f), \sum_{f=1}^{F} \alpha^2(f) = 1, f = 1, \ldots, F,$$

$$w_{MR}(f) = h'(f) = \frac{h^*(f)}{\|h(f)\|},$$

where h(f) is the 1×N vector representing the propagation channel at the f th sub-carrier, N is the number of antennas, h'(f) is the normalized channel vector, $w_{MR}(f)$ and $w_{TP}(f)$ are the N×1 weight vectors representing the MR and TP approaches, $P_T$ is the total power constraint, $\alpha(f)$ is a power loading function between sub-carriers and F is the number of sub-carriers.

The TP constraint does not restrict a shape of the antenna pattern. On the contrary, the Equivalent Isotropic Radiated Power (EIRP) constraint restricts an antenna pattern. This means that the beamforming designed under the conventional TP constraint may not be. directly applicable in the countries with the EIRP-based regulation. According to one regulation document, the EIRP constraint can be formulated as follows:

$$\max_{\Theta} \sum_{f=1}^{F} |w^*(f)a(\Theta, f)|^2 < EIRP_{average},$$

$$\max_{\Theta} |w^*(f)a(\Theta, f)|^2 < EIRP_{density}, f = 1, \ldots, F,$$

where $a(\Theta, f)$ is the N×1 vector of array manifold depending on the antenna configuration, $\Theta$ is the controllable direction-of-arrival, $EIRP_{average}$ and $EIRP_{average}$ and $EIRP_{density}$ are the regulation restrictions. For example, the $EIRP_{average}$ and $EIRP_{density}$ may be defined as $EIRP_{average}=100$ mW and $EIRP_{density}=10$ mW/MHz for the 2.4 GHz frequency band.

A scaled form of the conventional MR approach according to the EIRP constraint in the orthogonal frequency-division multiplexing (OFDM) case may be presented as follows:

$$w_{SMRB}(f) = \sqrt{\frac{EIRP_{average}}{\max_{\Theta} \sum_{f=1}^{F} |w_{TP}^*(f)a(\Theta, f)|^2}} w_{TP}(f), f = 1, \ldots, F.$$

An additional scaling according to the $EIRP_{density}$ constraint has been introduced similarly in the OFDM case referred to here as a Scaled MR Beamformer (SMRB).

When a direct optimization of the beamforming weights subject to the EIRP constraint is used in the narrow-band case, it may be formulated as follows:

Find $w_{EIRPnarrow-band} = \arg \max_{w} \text{Re}(h'w)$ subject to $|w^*a(\Theta_l)|^2 < EIRP, l = 1, \ldots, L,$ where L is the number of controllable directions. This approach turns out to be a convex Second Order Cone Programming (SOCP) problem that may be efficiently solved by any one of available numerical techniques, such as the Interior Point technique. In a similar fashion to the scaled MR OFDM case set forth above, by directly expanding the EIRP narrow-band approach to the OFDM case called here as Scaled EIRP Beamformer (SEB) results as:

$$w_{SEB}(f) = \sqrt{\frac{EIRP_{average}}{\max_{\Theta} \sum_{f=1}^{F} |\alpha(f) w^*_{EIRPnarrow\text{-}band}(f) a(\Theta, f)|^2}}$$

$$w_{EIRPnarrow\text{-}band}(f), f = 1, \ldots, F.$$

In another approach, a sub-carrier grouping may be applied to reduce the number of optimization parameters. This approach exploits correlation of the adjacent sub-carriers channels and uses one set of weights for a number of adjacent sub-carriers. However, one fundamental disadvantage in such a SMRB approach is that in some propagation conditions the averaged antenna pattern may result in sharp peaks leading to a corresponding reduction of the total power and significant performance degradation.

One fundamental disadvantage to the SEB approach set forth above is that narrow-band EIRP optimization may be a poorly defined (i.e., close to a singular problem), especially for a case with relatively low number of antennas, leading to a significant performance degradation. Singularity appears when the propagation channel belongs to the antenna manifold, e.g., to the class of plane waves. This may happen in a propagation scenario with a strong line-of-sight (LOS) or in a case of the low antenna resolution (low number of antennas), which is especially desirable for many wireless communication implementations.

SUMMARY OF THE INVENTION

The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

The present invention is directed to overcoming, or at least reducing, the effects of, one or more of the problems set forth above.

In one illustrative embodiment of the present invention, a method is provided for transmitting data in a downlink of a plurality of access point cells. The method includes providing a plurality of antennas at an access point to transmit the data to a wireless unit under at least one of a first and a second radiated power constraints. The method further includes using the plurality of antennas for beamforming over a group of sub-carriers subject to the first and/or second radiated power constraints.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions may be made to achieve the developers' specific goals, such as compliance with system-related and business-related constraints, which will vary from one implementation to another. Moreover, it should be appreciated that such a development effort might be complex and time consuming, but may nevertheless be a routine undertaking for those of ordinary skill in the art having the benefit of this disclosure.

Generally, a method and an apparatus are provided for transmitting data in a downlink of a plurality of access point cells in a wireless local area network (WLAN) to increase the range of the downlink for a given throughput under one or more radiated power constraints. A plurality of antennas at an access point may provide beamforming over a group of sub-carriers subject to one or more radiated power constraints. The multiple antenna based beamforming may increase the range of the downlink under the radiated power constraints for a given throughput of the downlink. Specifically, a joint beamformer extends the range of a wireless communication for a user of a wireless unit that may be located within a coverage area across the plurality of access point cells of a Wi-Fi network associated with the WLAN. The joint beamformer may apply a joint beamforming optimized over all of sub-carriers to account for a European regulation restriction into at least one of an averaged and a spectral density Equivalent Isotropic Radiated Power (EIRP) constraint. By decomposing a joint optimization a singularity problem may be overcome. The joint beamformer may normalize the joint optimization to provide a scaled, grouped EIRP-based beamforming in the downlink for a wireless local area network. In this way, the joint beamformer may extend the range of the downlink for a wireless communication at the given throughput in an Orthogonal Frequency-Division Multiplexing (OFDM) system. Such an OFDM-based joint beamformer may provide a significant performance improvement and range extension of the downlink in access point cells.

Figure 1:
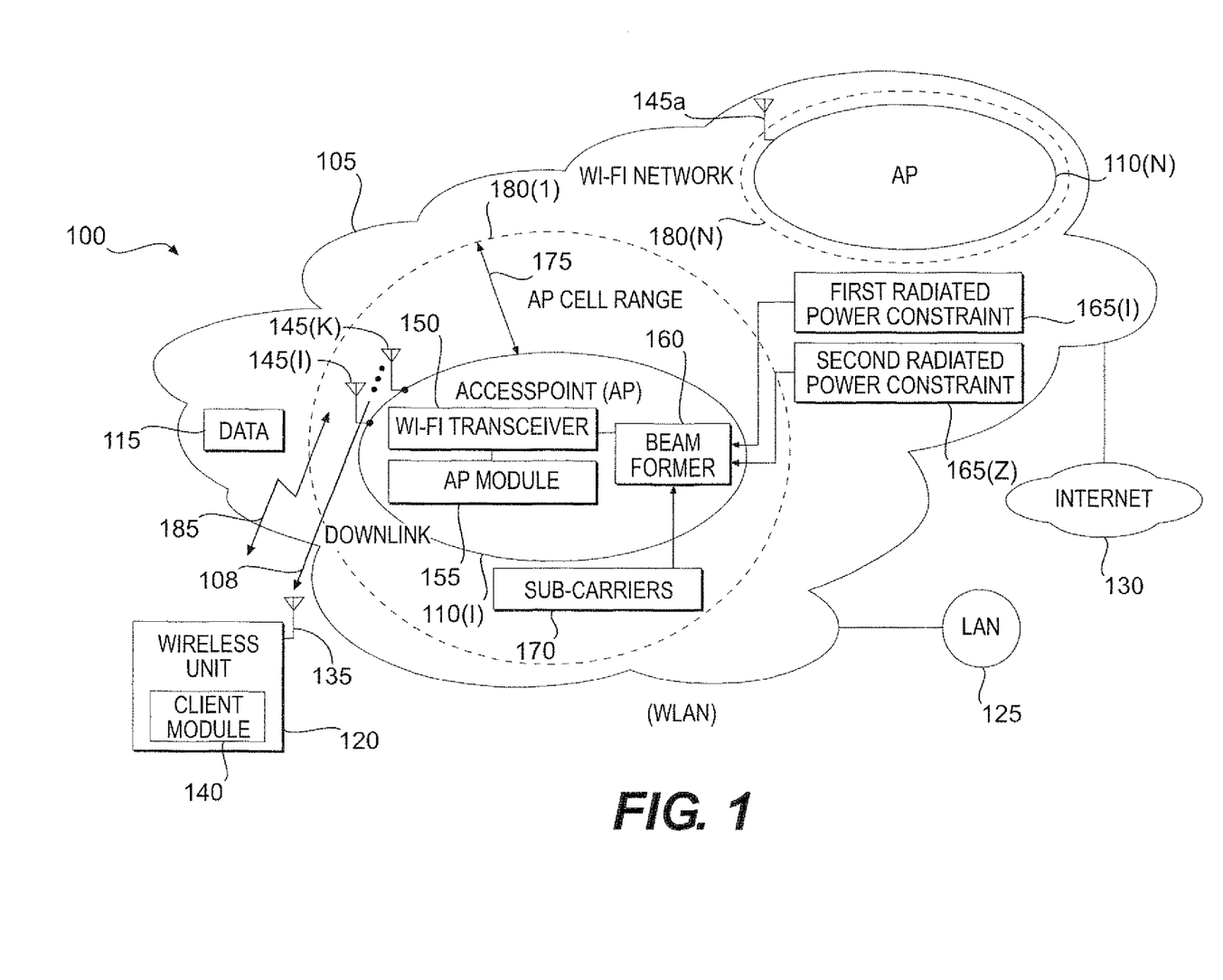
FIG. 1 schematically depicts a wireless local area network that includes a Wi-Fi network for increasing a wireless communication range between a plurality of access points and a wireless unit in a downlink according to one embodiment of the present invention.

Referring to FIG. 1, a wireless local area network (WLAN) 100 is schematically illustrated to enable desired wireless connectivity in a wireless network, such as a Wi-Fi network 105 over a downlink 108 that provides mobile or wireless communications to a user according to one embodiment of the present invention. The Wi-Fi network 105 may comprise a plurality of access points (APs) 110(1-N) to transmit data 115 in the downlink 108 to a wireless unit 120. The wireless unit 120 may be located within a coverage area of the Wi-Fi network 105 associated with a local area network 125 and internet 130.

To communicate with the access points (APs) 110(1-N), the wireless unit 120 may comprise an antenna 135 and a client module 140. The client module 140 may comprise instructions, such as a software program or a firmware that the wireless unit 120 may execute to provide a wireless service to a user over the Wi-Fi network 105. The client module 140, in one embodiment, may be defined at least in part, by an Institute of Electrical and Electronics Engineers (IEEE) 802.11x standard, for example x is equal to a, g, etc.

The wireless unit 120 may take the form of any of a variety of devices, such as mobile terminals or handsets including cellular phones, personal digital assistants (PDAs), laptop computers, digital pagers, wireless cards, and any other device capable of accessing the WLAN 100. Other examples of the wireless unit 120 may include smart phones, text messaging devices, and the like.

In one embodiment, the wireless local area network 100 may comprise one or more Wi-Fi networks including the Wi-Fi network 105. The Wi-Fi network 105 may include the plurality of access points 110(1-N) to support the mobile communications between the wireless unit 120 and the wireless local area network 100. For example, an access point, (AP) 110(1) may provide access over the downlink 108.

Consistent with one embodiment, the access point 110(1) may comprise a plurality of antennas 145(1), 145(K), a Wi-Fi transceiver 150, and an access point module 155. The wireless local area network 100 may enable the AP module 155 disposed at the access point 110(1) to communicate with the client module 140 located at the wireless unit 120.

To support the wireless unit 120 under at least one of a first and/or a second radiated power constraints 165(1,2), the access point 110(1), consistent with one embodiment of the instant invention, may comprise a beamformer 160. The beamformer 160 may generate a directional transmission to the wireless unit 120. In one embodiment, the first and second radiated power constraints 165(1,2) may be based on an average and a spectral density constraint. The first and/or second radiated power constraints 165(1,2) may account for a European regulation restriction. For example, the European regulation restriction may be associated with an averaged and a spectral density Equivalent Isotropic Radiated Power (EIRP) constraint.

For the purposes of beamforning over a group of sub-carriers 170 subject to the first and/or second radiated power constraints 165(1-2), the beamformer 160 may use the plurality of antenna 145(1-K) of the access point 110(1). Each access point 110 may have an associated range, i.e., an access point (AP) cell range 175 within the coverage area of the Wi-Fi network 105. The wireless local area network 100 may enable the access point 110(1) associated with the Wi-Fi network 105 to transmit the data 115 in the downlink 108 of a plurality of access point cells 180(1-N), in accordance with one embodiment of the present invention. To transmit the data 115 to the wireless unit 120 under the first and/or second radiated power constraints 165(1,2), the access point 110(1) may use the beamformer 160.

In operation, the beamformer 160 may use the plurality of antenna 145(1-K) of the access point 110(1) over a group of the sub-carriers 170 that may be subject to the first and/or second radiated power constraints 165(1,2). At the access point 110(1), the beamformer 160 may provision an increase in a coverage area of at least one access point cell 180 of the plurality of access point cells 180(1-N) for the wireless unit 120, which may be subject to the first and/or second radiated power constraints 165(1,2). By using the beamformer 160, in one embodiment, the access point 110(1) may transmit the data 115 to the wireless unit 120. However, the access point 110(1) may transmit the data 115 with a given throughput in the downlink 108 to a longer distance relative to the access point 110(N) having a single antenna 145a.

To increase the range 175 of the access point (AP) cell 180(1) for the given throughput in the downlink 108 of the wireless local area network 100, the beamformer 160 may apply joint beamforming, in one embodiment. The joint beamforming may be optimized over all of the sub-carriers 170. As one example, the beamformer 160 may apply an EIRP-based optimization over a group of non-adjacent sub-carriers with a low channel correlation. The beamformer 160 may decompose the joint optimization to overcome a singularity problem associated with the EIRP-based optimization. The beamformer 160 may further control power loading between at least two groups of sub-carriers. To provide a scaled, grouped EIRP-based beamforming, the beamformer 160 may normalize this joint optimization.

In the wireless local area network 100, wireless or mobile communications that communicate messages between the plurality of access points 110(1) and the wireless unit 120 may occur over an air interface via a wireless channel 185, such as a radio frequency (RF) medium channel that uses a time division duplex (TDD) system. For example, the wireless local area network 100, may use the wireless channel 185 transmit the data 115 to the wireless unit 120 from the access point 110(1) based on an orthogonal frequency-division multiplexing (OFDM) system architecture.

Consistent with one embodiment, the beamformer 160 may group at least two adjacent sub-carriers in the group of sub-carriers 170 with different channels. To this end, the beamformer 160 may use knowledge of a transmission channel. Using the knowledge of the transmission channel, such as the wireless channel 185, the beamformer 160 may provide beamforming in the downlink 108. For example, the beamformer 160 may obtain the knowledge of the wireless channel 185 for a time division duplex (TDD) system to extend the range 175 of the downlink 108 for a wireless communication at the given throughput. Likewise, the beamformer 160 may selectively specify a spectral density constraint for one or more bands, in one embodiment, to extend the range 175.

The Wi-Fi network 105 may be based on a wireless network protocol that uses unregulated spectrum for establishing a wireless communication over the wireless channel 185. The wireless unit 120 may include or incorporate wireless protocols, such as IEEE 802.11, IEEE 802.11a/g, or the like for communicating with the Wi-Fi network 105 in the wireless local area network 100.

One well-known set of specifications, such as IEEE 802.11 standards describe the operation of the wireless unit 120 and the access points (AP) 110(1-N) in the Wireless Local Area Network (WLAN) 100. The specifications identify both the physical layer (PHY), which details the nature of the transmitted signals, as well as the medium access control (MAC), which defines a complete management protocol for interaction between wireless units and access points.

Specifically, three versions of the standard exist, all sharing the same MAC. 802.11b operates in the 2.4 GHz frequency band and has a PHY based on code-division multiple access (CDMA) offering a peak data rate of 11 Mbits/s. 802.11a and 802.11g operate in the 5.2 and 2.4 GHz bands respectively, both sharing a PHY based on orthogonal frequency division multiplexing (OFDM) offering a peak data rate of 54 Mbits/s. The 802.11 specifications allow interoperability between equipment from multiple vendors, and are commercially marketed as Wi-Fi.

The wireless unit 120 may move across overlapping coverage zones referred to as cells of the access points 110(1-N). However, the wireless unit 120 may communicate simultaneously to two or more access point (AP) cells 180, or in some cases with two sectors on the same cell, permitting a call to continue even though the signal from any one cell would not be strong enough to keep the call up.

In one embodiment, the Wi-Fi network 105 may generally operate at 2.4 Giga Hertz (GHz) and use a wireless data networking protocol to connect personal computers (PCs) and laptops to a network, essentially enabling wireless communication between a Wi-Fi enabled device and the WLAN 100 via a radio frequency (RF) link. For example, the wireless unit 120 may connect to an access point, e.g., the access point 110(1) at speeds of up to 11 Megabit per second, or million (1,048,576) of bits per second (Mbps). While the wireless unit 120 may be based on various industry standards including the IEEE 802.11a and IEEE 802.11g standards, the Wi-Fi network 105 may enable wireless data communication as a Wireless Ethernet that supports several standards, such as IEEE 802.11a/b and g. The Wi-Fi network 105 may provide a high-speed wireless network that provides access to online or Internet content of the Internet 130.

The access point 110(1-N) may estimate channel information for a channel of a corresponding user. The access point 110(1) may receive the channel information from the wireless unit 120 in a feedback signaling as a quantized feedback. In a TDD system, however, such as in an IEEE 802.11 standard compliant wireless communication system, the wireless local area network 100 may use channel reciprocity instead to obtain the channel information.

Although two access points 110(1,N) are shown in FIG. 1, persons of ordinary skill in the pertinent art having benefit of the present disclosure should appreciate that any desirable number of access points 110 may be used. The access points 110(1-N) may provide wireless connectivity to associated geographical areas within the wireless local area network 100. The wireless connectivity may be provided according to any one of desirable modulation schemes including an Orthogonal Frequency Division Multiplexing (OFDM) that uses a modulation technique which transmits data across many carriers for high data rates and an ad-hoc network.

Although the Wi-Fi network 105 is shown to include the access points 110(1,N) in FIG. 1, persons of ordinary skill in the art should appreciate that portions of the Wi-Fi network 105 may be suitably implemented in any number of ways to include other components using hardware, software, or a combination thereof. The wireless local area networks are known to persons of ordinary skill in the art and so, in the interest of clarity, only those aspects that are relevant to the present invention will be described herein.

Figure 2:
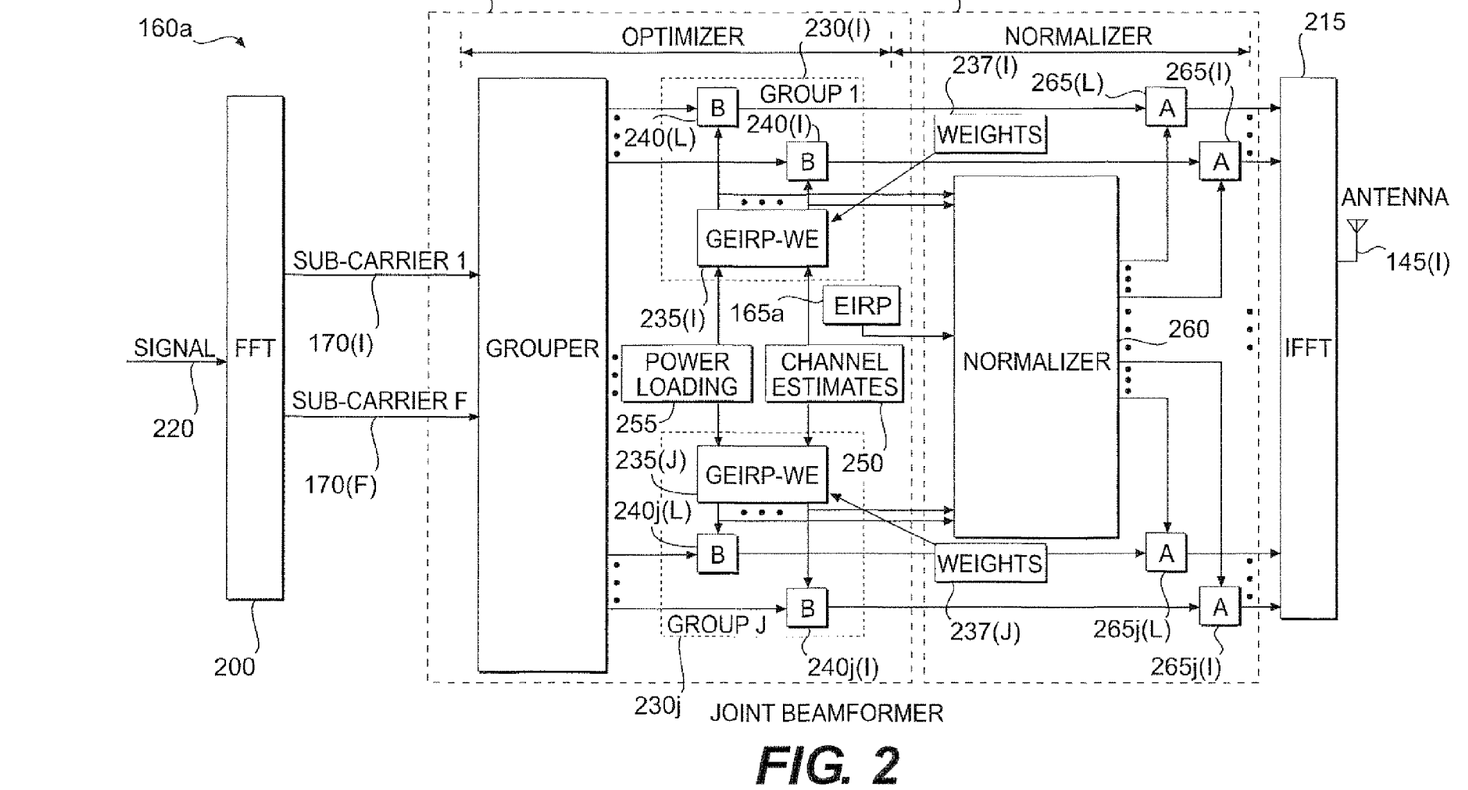
FIG. 2 schematically depicts one embodiment of a joint beamformer for beamforming at an access point shown in FIG. 1, in accordance with one embodiment of the present invention.

Referring to FIG. 2, one embodiment of a joint beamformer 160a is depicted in accordance with one embodiment of the present invention. The joint beamformer 160a may comprise a Fast Fourier Transform (FFT) block 200, an optimizer 205, a normalizer 210, an Inverse Fast Fourier Transform (IFFT) 215. The FFT block 200 may transform a transmitted signal 220 into frequency domain. Using an Octagonal Frequency Division Multiplexing (OFDM), in one embodiment, the FFT block 200 may output a plurality of sub-carriers 170(1-F).

To process the plurality of sub-carriers 170(1-F), the optimizer 205 may comprise a grouper 225 that forms one or more groups of the sub-carriers 170(1-F). For example, the grouper 225 may group the 170(1-F) into a plurality of groups 230(1-J). The grouper 225, in one embodiment, may form groups 230 from non-adjacent sub-carriers with uncorrelated channels. While the optimizer 205 may apply an EIRP-based optimization over a group of sub-carriers to overcome a singularity problem, the joint beamformer 160a may decompose the joint optimization over all the sub-carriers subject 170(1-F) to the first and/or second radiated power constraints 165 (1,2) such as, the averaged EIRP constraint and the spectral density EIRP constraint. To enable the decomposition, the grouper 225 divides all the sub-carriers 170(1-F) in J groups i.e., 230(1-J).

To optimize weights 237 for all the sub-carriers 170(1-F) in each group 230, the optimizer 205 may comprise a group EIRP weight estimator (GEIRP-WE) 235 for each group. Additionally, the optimizer 205 may comprise a set of beamformers 240(1-L) for each group 230. The group EIRP weight estimator 235(1) may calculate weights 237(1) for the group 230(1). The beamformers (B) 240(1-L) may form an output signal by first multiplying a group of sub-carriers from the transmitted signal 220 and antenna weights 237 calculated in the group EIRP weight estimator 235 based on the channel estimates 250 and the constraints 255. In this way, each group 230 may be processed separately at the optimizer 205 by the beamformer 240(1-L) using the weights 237(1) based on channel estimates 250 and one or more power loading constraints 255, as described below.

In the joint beamformer 160a, the normalizer 210 may couple to the optimizer 205 and comprise a normalizator 260 that calculates a plurality of normalization coefficients based on the first and/or second radiated power constraints 165(1,2), such as EIRP constraints 165a. The normalizer 210 may further comprise a set of attenuators (A) 265(1-L) for each group 230. The Inverse Fast Fourier Transform 215 may receive all optimally weighed sub-carrier signals 270 (1-F) separately into time domain for each antenna, such as for the antenna 145(1) associated with the access point 110(1).

Using beamforming at the access point 110(1) subject to the total power (TP) constraint, a range extension may be provided via the multiple antennas 145(1-K). By using the plurality of antennas 145(1-K) at the access point 110(1), over the downlink 108, the data 115 may be transmitted to an unmodified single antenna wireless unit with the given throughput to a longer distance compared to a conventional single antenna AP taking into account one or more European regulation restrictions formulated in terms of the averaged and spectral density Equivalent Isotropic Radiated Power (EIRP) constraint 165*a*.

Figure 3:
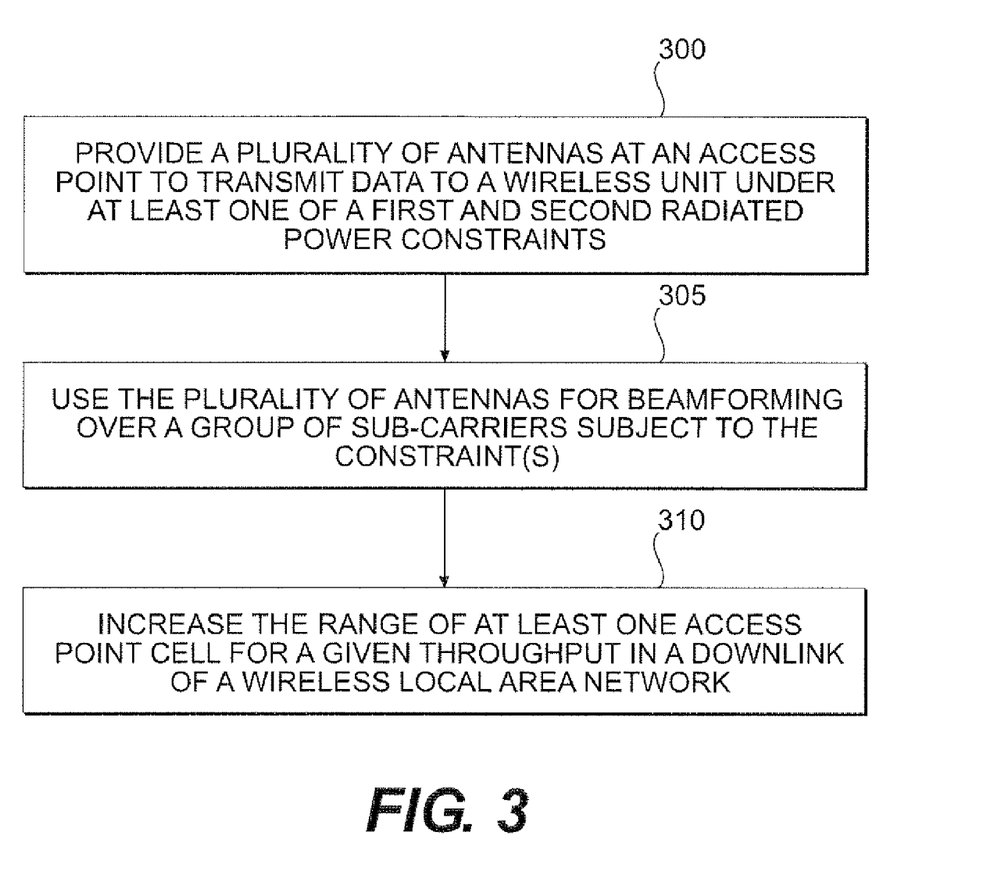
FIG. 3 illustrates a stylized representation of a flow chart implementing a method of transmitting data in the downlink of a plurality of access point cells in the wireless local area network shown in FIG. 1 consistent with one embodiment of the present invention.

Referring to FIG. 3, a stylized representation of a flow chart implementing a method is illustrated for transmitting the data 115 in the downlink 108 of the plurality of access point (AP) cells 180(1-N) in the wireless local area network 100 shown in FIG. 1 consistent with one embodiment of the present invention. To transmit the data 115 to the wireless unit 120 under at least one of the first and second radiated power constraints 165(1,2), multiple antennas, such as the plurality of antennas 145(1-K) may provided at the access point (AP) 110(1), as shown in block 300.

At block 305, the plurality of antennas 145(1-K), at the access point 110(1) may be used for beamforming by the joint beamformer 160*a* over the group of sub-carriers 170(1-F) that may depend upon the first and/or second radiated power constraints 165(1,2). The access point 110(1) may extend the range of the downlink 108 since the joint beamformer 160*a* provides a desired selection of the sub-carrier grouping, such as non-adjacent or adjacent grouping for beamforming. For a given throughput, using such joint and optimized beamforming a wireless communication over the wireless channel 185 may be transmitted to a longer distance than the access point 110(N), as indicated in block 310. In this way, the range 175 of at least one access point cell 180 may be increased for the given throughput in the downlink 108, using the joint beamformer 160*a*.

Figure 4:
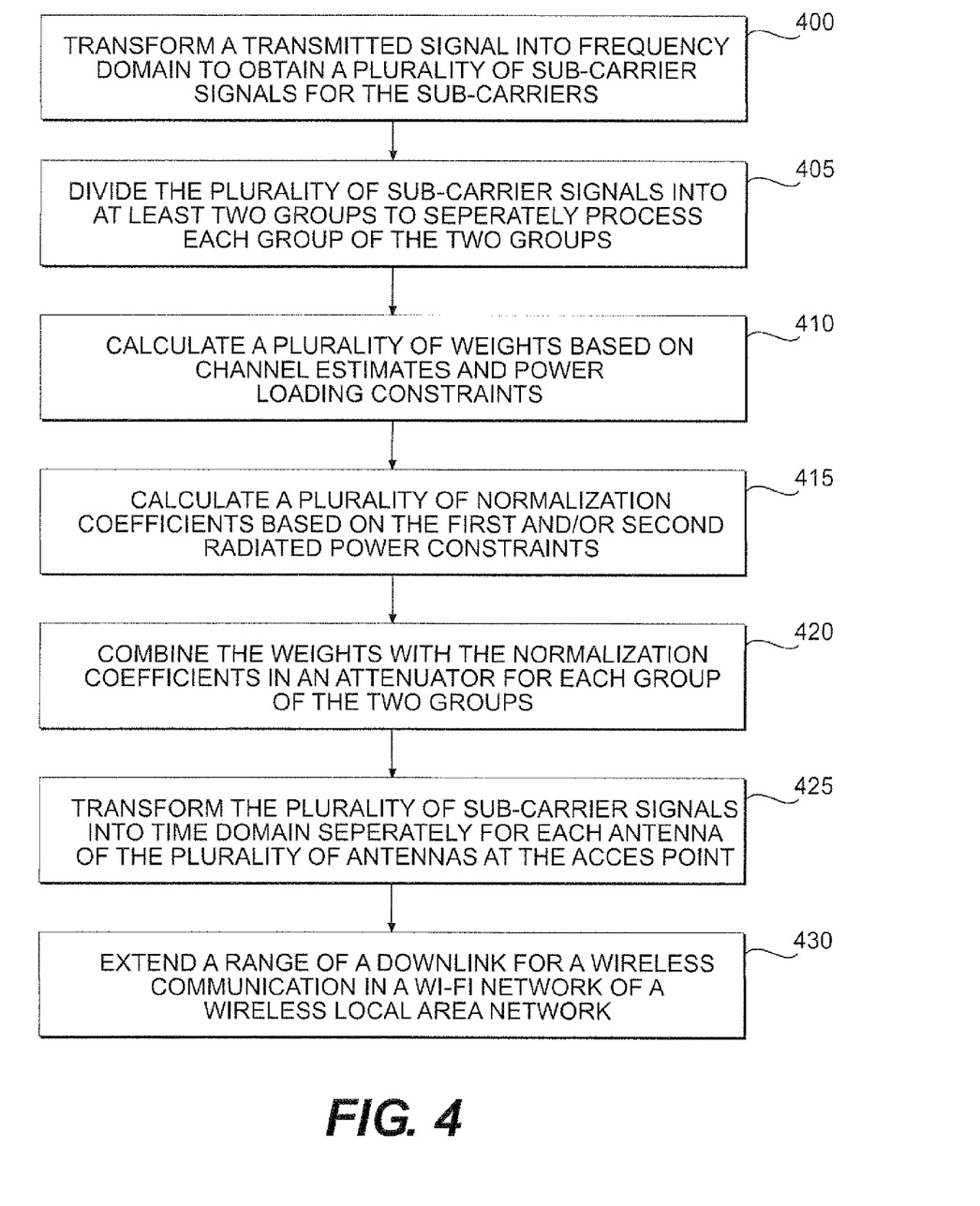
FIG. 4 illustrates a stylized representation of a flow chart implementing a method of increasing the range of the access point cells shown in FIG. 1 for a given throughput in the downlink of the wireless local area network according to one embodiment of the present invention.

Turning now to FIG. 4, a stylized representation of a flow chart implementing a method is illustrated to increase the range 175 of the access point cells 180(1-N) for a given throughput in the downlink 108 of the wireless local area network 100 according to one embodiment of the present invention. At block 400, the FFT block 200 transforms the transmitted signal 220 into frequency domain. By this transformation in the joint beamformer 160*a*, the access point 110(1) may obtain the plurality of sub-carrier signals 170(1-F) from the sub-carriers 170. To separately process each group 230, the grouper 225 divides the plurality of sub-carriers signals 170(1-F) at block 405, into at least two groups 230(1,J). At block 410, the group EIRP weight estimator 235(1) may calculate of weights 237(1) based on the channel estimates 250 and the power loading constraints 255.

Based on the first and/or second radiated power constraints 165(1,2), such as the EIRP constraints 165*a*, the normalizator 260 at the normalizer 210 may calculate the plurality of normalization coefficients at block 415. By combining the weights 237 with the normalization coefficients, in a set of attenuators (A) 265(1-L) for each group 230, at block 220, the normalizer 210 may provide a scaled, EIRP grouped beamforming at the joint beamformer 160*a*, as shown in block 420.

For transforming the plurality of sub-carrier signals 170(1-F) back into time domain, the normalizer 210 provides output to the Inverse Fast Fourier Transform (IFFT) 215. A separate inverse transformation for each antenna, such as the antenna 145(1) of the plurality of antennas 145(1-K) at the access point 110(1) enables range extension with multiple antenna beamforming, as depicted in block 425. In this manner, the beamformer 160*a* extends the range 175 of the downlink 108 for a wireless communication in the Wi-Fi network 105 in the wireless local area network 100 as shown in block 430.

Accordingly, the joint beamformer 160*a* disposed at the access point (AP) 110(1) may increase the downlink 108 range in an IEEE 802.11a/g cell subject to the European regulation constraints. Such an increase in the range of the downlink 108 may be obtained without modifying legacy mobile devices, such as the IEEE 802.11a/g-compliant mobile devices. As one example, the joint beamformer 160*a* provides beamforming over all the sub-carriers 170(1-F) subject to both $EIRP_{average}$ and $EIRP_{density}$ constraints as follows:

$$\text{Determine } w_{EIRP} = \arg \max_{w} \min_{f} \text{Re}(\alpha(f)h'(f)w(f)),$$

subject to $$\sum_{f=1}^{F} |w^*(f)a(\Theta_l, f)|^2 < EIRP_{average}, \; l = 1, \ldots, L,$$

$$|w^*(f)a(\Theta_l, f)|^2 < EIRP_{density}, \; f = 1, \ldots, F, l = 1, \ldots, L,$$

where $\alpha(f)$ is a power loading function used for the power loading constraint 255. The $EIRP_{density}$ constraint may be formulated over each sub-carrier separately. Similarly, it may be formulated over a desired sub-bands, for example, 1 MHz resolution (approximately 3 adjacent sub-carriers) is defined in the 2.4 GHz band.

This approach presents again a convex SOCP problem similar to the SEB case. Unfortunately, a relatively high number of variables and restrictions may make this approach impractical. Indeed, 52 working sub-carriers in 802.11a/g lead to 208 and 312 real value optimization parameters in the 2 and 3 antenna cases respectively. This approach is relatively complicated for on-line implementation and even for simulations.

By applying an EIRP-based optimization over a group of sub-carriers 170, the beamformer 160*a* may overcome a singularity problem and decompose the joint optimization. The joint beamformer 160*a* may form groups from non-adjacent sub-carriers with uncorrelated channels and may optimize weights 237 for all the sub-carriers in each group 230.

The normalization coefficients may be calculated in the normalizator 260 according to the $EIRP_{average}$ and $EIRP_{densiy}$ constraints and used at the attenuators (A) 265 for normalization, all the sub-carrier signals 170(1-F) may be transformed into time domain in the Inverse FFT (IFFT) may perform block 215 separately for each antenna 145.

In an exemplary embodiment, the joint beamformer optimization as follows:

$$\text{Determine for } j = 1, \ldots, J: w_j = \arg \max_{w} \min_{f \subset \Phi_j} \text{Re}(\alpha(f)h'(f)w(f)),$$

subject to $$\sum_{f \subset \Phi_j} |w^*(f)a(\Theta_l, f)|^2 < v_j, l = 1, \ldots, L,$$

where $\Phi_j$ is the j-th group of sub-carriers, J is the number of groups 230 and $v_j$ is the parameter controlling a power loading between groups 230.

The joint beamformer 160a may perform the normalization as follows:

$$\tilde{w}_{SEGB}(f) = \sqrt{\frac{EIRP_{average}}{\max_\Theta \sum_{f \subset \Phi_j, j=1,\ldots,J} |w_j^*(f)a(\Theta, f)|^2}} \, w_j(f),$$

$$f \subset \Phi_j, \, j = 1, \ldots, J,$$

$$w_{SEGB}(f) =$$

$$\begin{cases} \tilde{w}_{SEGB}(f), & |\tilde{w}_{SEGB}^*(f)a(\Theta, f)|^2 \le EIRP_{density} \\ \sqrt{\frac{EIRP_{density}}{\max_\Theta |\tilde{w}_j^*(f)a(\Theta, f)|^2}} \, \tilde{w}_{SEGB}(f), & |\tilde{w}_{SEGB}^*(f)a(\Theta, f)|^2 > EIRP_{density} \end{cases}.$$

In one embodiment, for a scaled EIRP, grouped beamformer (SEGB), such as the joint beamformer 160a one example of a desired grouping for an IEEE 802.11a/g wireless communication system for at least two sub-carriers in a group 230 (J=52/2 =26) with a constant frequency shift may be denoted as follows:

$$\Phi_j = [5+j, 32+j], \, j=1, \ldots, 26,$$

where only 52 out of 64 sub-carriers are enumerated because sub-carriers 1, . . . , 5, 32 and 59, . . . , 64 are not in use in the IEEE 802.11a/g standard.

The following simulation compares performance of the joint beamformer 160a to some known approaches to beamforming. For the purposes of such simulations, a linear antenna array with two wavelengths distance between antennas, uniform power loading between sub-carriers and a "D"-channel propagation model (50 ns RMS delay spread) is used for 2.4 GHz frequency band in IEEE 802.11g wireless communication system.

Figure 5:
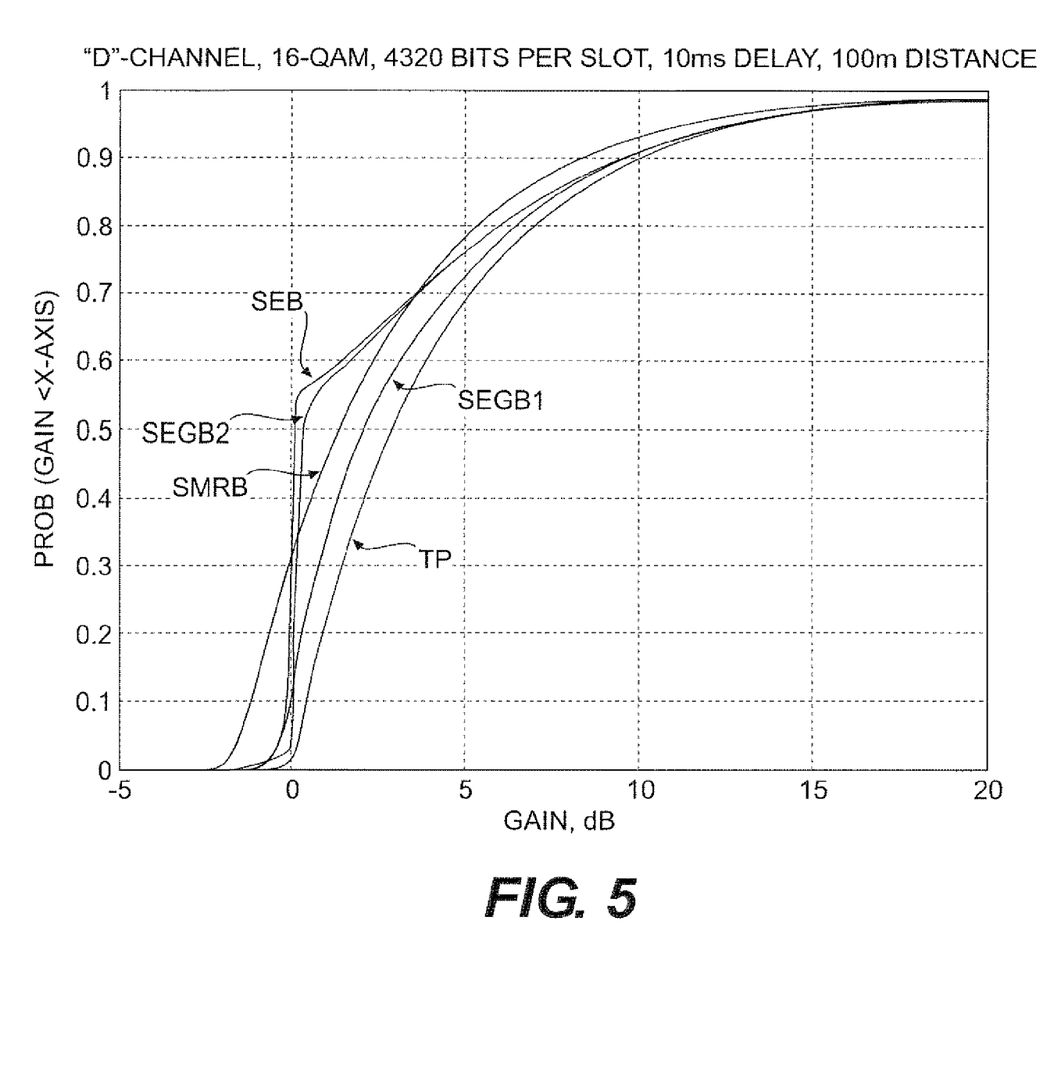
FIG. 5 is a stylized representation of stimulation results for distribution of Signal-to-Noise Ratio (SNR) gain for a two-antenna access point at the wireless unit with the beamformer shown in FIG. 1 using two sub-carriers in each group according to one embodiment of the present invention.
Figure 6:
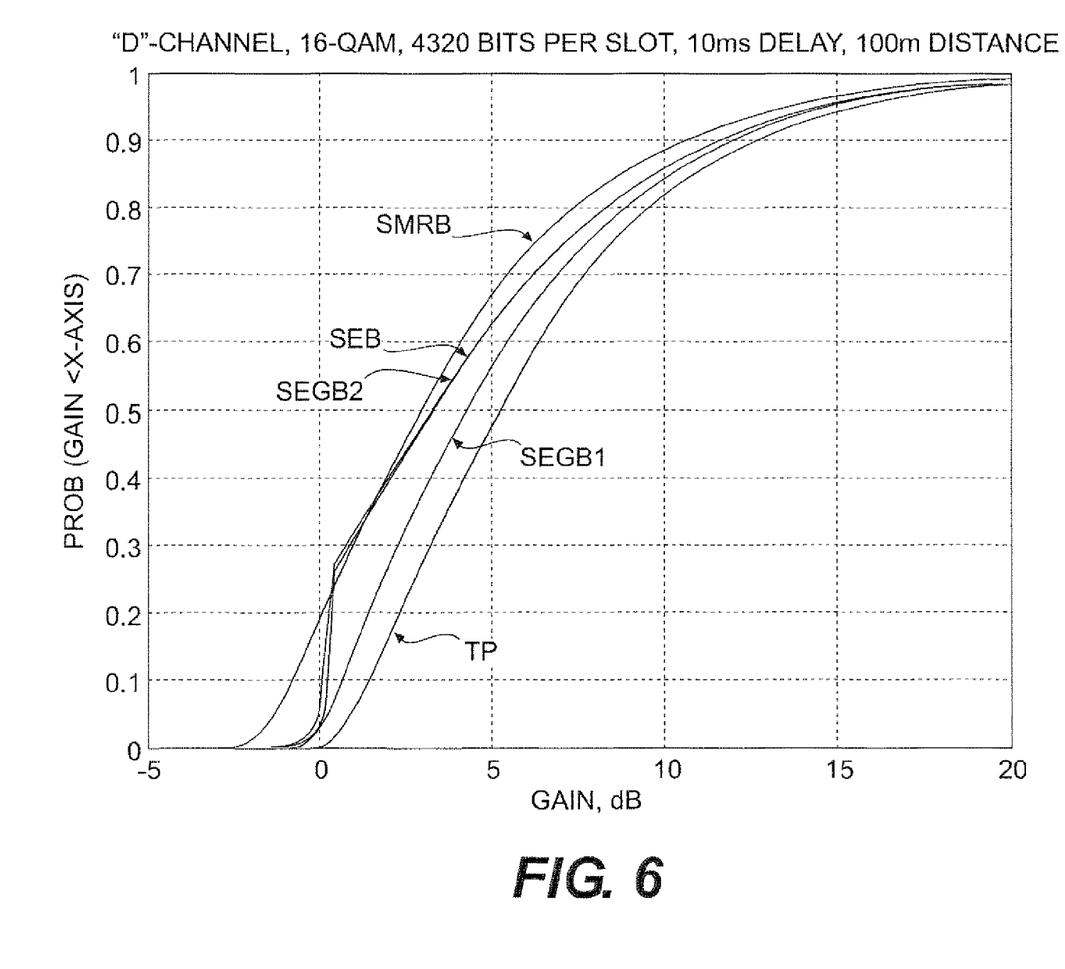
FIG. 6 is a stylized representation of stimulation results for distribution of Signal-to-Noise Ratio (SNR) gain for a three-antenna access point at the wireless unit with the beamformer shown in FIG. 1 using two sub-carriers in each group according to one embodiment of the present invention.

More specifically, FIGS. 5 and 6 show Cumulative Distribution Functions (CDF) for Signal-to-Noise Ratio (SNR) gain at the wireless unit 120 for N=2 and N=3 antennas 145 at the AP 110(1), respectively. The SNR gain may be calculated and compared to the single antenna AP 110(N). Where a fixed delay of 10 ms is assumed for the channel estimates 250.

While FIG. 5 illustrates distribution of the SNR gain for a two-antenna AP 110 in the "D"-channel environment, FIG. 6 illustrates distribution of the SNR gain for a three-antenna AP 110 in the "D"-channel environment. As depicted in FIGS. 5 and 6, two sub-carriers in each group illustrate desired selections of the sub-carrier 170(1-F) grouping. For example, a first model of the joint beamformer 160a, SEGB1, uses non-adjacent grouping defined above and a second model, SEGB2, uses an adjacent grouping as follows:

$$\Phi_j = \begin{cases} [6 + 2(j-1), 7 + 2(j-1)], & j = 1, \ldots, 13 \\ [33 + 2(j-1), 34 + 2(j-1)], & j = 14, \ldots, 26 \end{cases},$$

which is consistent with OFDM beamforming.

In one embodiment, use of a scaled maximum ratio beamformer (SMRB) demonstrates a significant performance degradation compared to a basic total power (TP) constraint based beamformer. A direct application of a narrow-band EIRP-restricted approach to a scaled EIRP beamformer (SEB), such as the joint beamformer 160a may marginally improve beamforming, especially in a two-antenna access point (AP) 110 case, where zero dB gain is observed in many simulation trials. Such a zero dB gain indicates that a single antenna at the optimizer 205 may result in singular situations. The second model of the joint beamformer 160a, SEGB2, demonstrate some improvement compared to the SEB beamformer because highly correlated channels in a group may not allow overcoming the singularity problem. On the contrary, use of the SEGB1 model based beamformer, such as the joint beamformer 160a, provides a significant performance improvement for both scenarios depicted in FIGS. 5 and 6.

Figure 7:
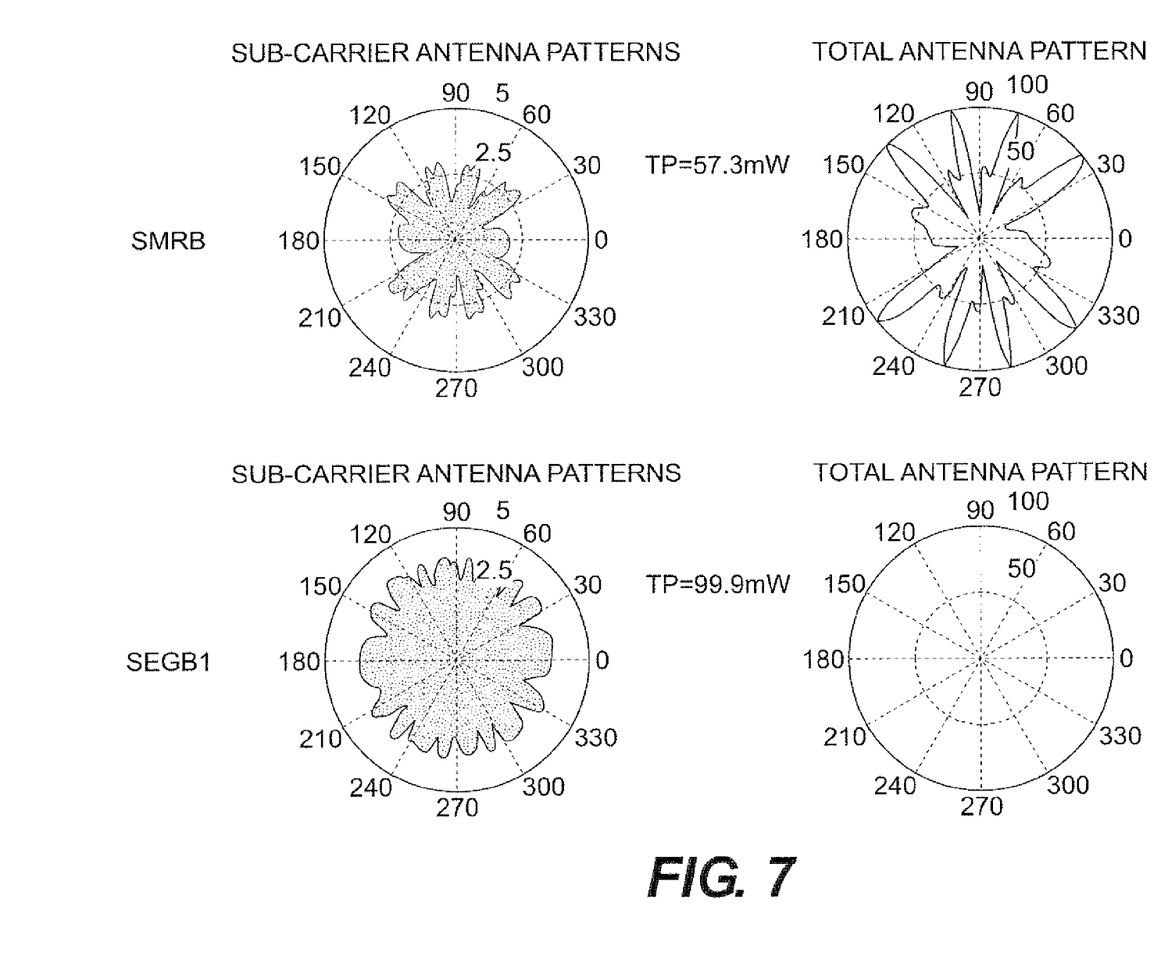
FIG. 7 illustrates a stylized representation of sub-carrier antenna patterns and the total antenna patterns for a scaled maximum ratio beamformer using non-adjacent grouping of all sub-carrier to provide beamforming in an orthogonal frequency-division multiplexing (OFDM) system based on at least one of two radiated power constraints in accordance with one embodiment of the present invention.

Referring to FIG. 7, which illustrates another embodiment of the present invention based on an exemplary use of all the 52 sub-carriers and the total antenna patterns for the SMRB and SEGB1 based beamformers in a three-antenna AP 110 case. In this example, sharp co-located sub-carrier beams may be formed for the SMRB case leading to a significant total power reduction because of the $EIRP_{average}$ constraint. In this approach, much stronger spatially distributed beams may be formed that lead to the omni-directional total pattern and $TP \approx EIRP_{average} = 100$ mW.

Figure 8:
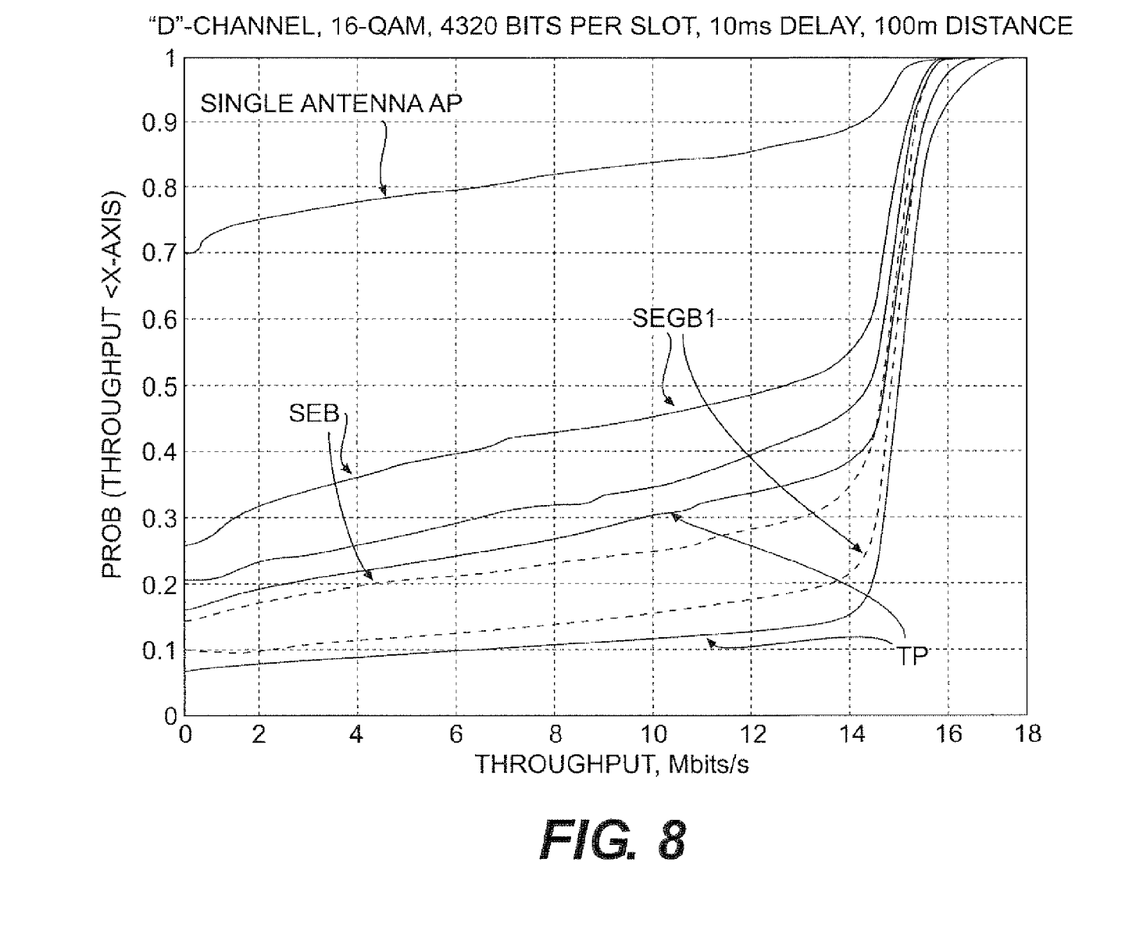
FIG. 8 schematically illustrates one embodiment of range extension based on the joint beamformer shown in FIG. 2 for a given throughput in the downlink of FIG. 1 for two and three antenna access points.

Turning now to FIG. 8, a range extension for the given throughput on the downlink 108 is illustrated for 16-QAM signaling in the same environment as shown in FIGS. 5 and 6. A SEGB1 model based beamformer, such as the joint beamformer 160a outperforms some other known beamformers and demonstrates results substantially close to a beamformer of the total power (TP) constraint case.

However, persons of ordinary skill in the art having benefit of the present disclosure should appreciate that the present invention is not limited to the joint beamformer 160a. In alternative embodiments, a suitable beamformer may enable the access point 110(1) to provide different capabilities and/or additional capabilities to control the transmission in the downlink 108 using multi-antenna beamforming under a variety of different constraints.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring mathematical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The present invention set forth above is described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

While the invention has been illustrated herein as being usefull in a cellular telecommunications network environment, it also has application in other wireless environments. For example, wireless environments may include 802.11(a), 802.11(b), 802.11(g), Bluetooth, or the like. The present invention may have application in any wireless environment where two or more users are interconnected and capable of communicating with one another.

Those skilled in the art will appreciate that the various system layers, routines, or modules illustrated in the various embodiments herein may be executable control units. The control units may include a microprocessor, a microcontroller, a digital signal processor, a processor card (including one or more microprocessors or controllers), or other control or computing devices as well as executable instructions contained within one or more storage devices. The storage devices may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy, removable disks; other magnetic media including tape; and optical media such as compact disks (CDs) or digital video disks (DVDs). Instructions that make up the various software layers, routines, or modules in the various systems may be stored in respective storage devices. The instructions, when executed by a respective control unit, causes the corresponding system to perform programmed acts.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

I claim:

1. A method of transmitting data in a downlink of a plurality of access point cells, the method comprising:
    providing a plurality of antennas at an access point to transmit said data to a wireless unit under at least one of a first and a second radiated power constraints;
    selecting a group of sub-carriers including a plurality of non-adjacent sub-carriers with a low channel correlation; and
    performing joint beamforming over the group of sub-carriers to determine a plurality of weights to be applied to each sub-carrier for transmission using said plurality of antennas, said joint beamforming being performed subject to said at least one of said first and second radiated power constraints.

2. The method set forth in claim 1, further comprising:
    in response to said joint beamforming at said access point, provisioning an increase in a coverage area of at least one access point cell of said plurality of access point cells for said wireless unit subject to at least one of said first and second radiated power constraints.

3. The method set forth in claim 1, further comprising:
    formulating said first and second radiated power constraints based on an averaged and a spectral density based constraint, respectively.

4. The method set forth in claim 1, further comprising:
    transmitting said data at a given throughput in said downlinik to said wireless unit having a single antenna to a longer distance relative to another access point having one antenna.

5. The method set forth in claim 1, further comprising:
    accounting for a European regulation restriction into said at least one of said first and second radiated power constrains.

6. The method set forth in claim 5, where said European regulation restriction is associated with an averaged and a spectral density equivalent isotropic radiated power constraint.

7. The method set forth in claim 1, further comprising:
    applying the joint beamforming optimized over all of said sub-carriers.

8. The method set forth in claim 1, further comprising:
    applying an equivalent isotropic radiated power-based optimization over the group of non-adjacent sub-carriers with a low channel correlation.

9. The method set forth in claim 8, further comprising:
    decomposing the joint optimization to overcome a singularity problem associated with said equivalent isotropic radiated power-based optimization.

10. The method set forth in claim 9, further comprising:
controlling a power loading between at least two groups of said sub-carriers.

11. The method set forth in claim 10, further comprising:
    normalizing said joint optimization to provide a scaled, grouped equivalent isotropic radiated power-based beamforming.

12. The method set forth in claim 11, further comprising:
    grouping at least two non-adjacent sub-carriers in said group of sub-carriers with different channels.

13. The method set forth in claim 1, further comprising:

using knowledge of a transmission channel to provide said beamforming in said downlinik for a wireless local area network.

14. The method set forth in claim 13, further comprising:

obtaining said knowledge for a time division duplex system to extend a range of said downlinik for a wireless communication at a given throughput.

15. The method set forth in claim 14, further comprising:

extending said range of said downlinik for said wireless communication at said given throughput in an orthogonal frequency-division multiplexing system.

16. The method set forth in claim 13, further comprising:

selectively specifying a spectral density constraint for one or more bands.

17. The method set forth in claim 1, further comprising:

transforming a transmitted signal into frequency domain to obtain a plurality of sub-carrier signals from said sub-carriers.

18. The method set forth in claim 17, further comprising:

dividing said plurality of sub-carrier signals into at least two groups to separately process each group of said at least two groups.

19. The method set forth in claim 18, further comprising:

calculating a plurality of weights based on channel estimates and one or more power loading constraints; and calculating a plurality of normalization coefficients based on said at least one of said first and second radiated power constraints.

20. The method set forth in claim 19, further comprising:

combining said plurality of weights with said plurality of normalization coefficients in a set of attenuators for each group of said at least two groups; and transforming said plurality of sub-carrier signals into time domain separately for each antenna of said plurality of antennas.

* * * * *

UNITED STATES PATENT AND TRADEMARK OFFICE
CERTIFICATE OF CORRECTION

PATENT NO. : 7,599,714 B2  Page 1 of 1
APPLICATION NO. : 11/241896
DATED : October 6, 2009
INVENTOR(S) : Alexandr Kuzminskiy It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 737 days.

Signed and Sealed this

Twenty-eighth Day of September, 2010

David J. Kappos
*Director of the United States Patent and Trademark Office*